United States Patent
Enderich et al.

[19]

[11] Patent Number: 5,986,359
[45] Date of Patent: Nov. 16, 1999

[54] POWER DELIVERY CIRCUIT WITH SHORT CIRCUIT PROTECTION

[75] Inventors: Mark A. Enderich, Riverview; Shawn P. Slusser, Farmington Hills; Chris A. Wunderlich, Canton, all of Mich.

[73] Assignee: Lear Automotive Dearborn, Inc., Southfield, Mich.

[21] Appl. No.: 08/636,799

[22] Filed: Apr. 23, 1996

[51] Int. Cl.$^6$ .................................................. H01H 47/00
[52] U.S. Cl. ........................ 307/125; 307/139; 307/130; 361/93; 318/434
[58] Field of Search ................................. 307/130, 142, 307/139, 140, 112, 116, 125; 318/264, 272, 269, 275, 138, 254, 258, 273, 293, 734; 361/93, 101, 75, 86; 323/55–58

[56] References Cited

U.S. PATENT DOCUMENTS

| | | | |
|---|---|---|---|
| 4,787,007 | 11/1988 | Matsumura et al. | 361/98 |
| 4,810,943 | 3/1989 | Kawaguchi et al. | 318/434 |
| 4,849,651 | 7/1989 | Estes, Jr. | 307/125 |
| 4,985,666 | 1/1991 | Nakabayashi | 318/434 |
| 5,304,935 | 4/1994 | Rathke et al. | 324/415 |
| 5,340,202 | 8/1994 | Day | 303/19 |
| 5,530,332 | 6/1996 | Rees | 318/685 |
| 5,563,759 | 10/1996 | Naad | 361/101 |
| 5,627,717 | 5/1997 | Pein et al. | 361/95 |
| 5,650,705 | 7/1997 | Hart | 318/635 |
| 5,723,915 | 3/1998 | Maher et al. | 307/131 |

OTHER PUBLICATIONS

SGS Power Linear Actuators Data Book, $2^{nd}$ Edition, 1984, pp. 54–55.

*Primary Examiner*—Jeffrey Gaffin
*Assistant Examiner*—Jonathan S. Kaplan
*Attorney, Agent, or Firm*—Brooks & Kushman P.C.

[57] ABSTRACT

The present invention advantageously provides a microprocessor controlled power delivery circuit with short circuit protection. The microprocessor controls the load current flow at the circuit's load connection terminal by connecting this terminal to the positive or negative side of a power supply or opening the circuit to prevent current flow. The short circuit protection uses a passive electrical component feedback circuit to communicate the voltage level at the circuit's load connection terminal back to the microprocessor. The microprocessor routinely monitors this voltage and compares this voltage against the expected voltage at this terminal. When the actual voltage does not match the expected voltage, the circuit will provide protection by interrupting current flow through the load connection terminal.

32 Claims, 6 Drawing Sheets

POWER DELIVERY CIRCUIT WITH SHORT CIRCUIT PROTECTION

FIELD OF THE INVENTION

This invention relates generally to a power delivery circuit for controlling electrical power flow to loads, wherein the circuit comprises short circuit protection. More particularly, this invention relates to a load current power delivery circuit having microprocessor controlled short circuit protection.

BACKGROUND OF THE INVENTION

The advent of solid state power drivers, specifically half-bridge drivers, and their use in power delivery circuits has created the need to monitor and to protect these drivers against prolonged high current conditions due to short circuits. The protection schemes employed heretofore in these power delivery circuits have been complicated, not completely effective and relatively expensive. The conventional circuits utilized hardware protection schemes that included various types of active electrical component circuits such as transistors and other types of switches including current sensing switches. Most often the conventional short circuit protection schemes only provided protection against one type of short, typically, shorts to the power supply's ground.

These power delivery circuits are commonly provided with multiple microprocessor controlled current flow paths. The automobile industry has made use of these multi-current path circuits for controlling motorized automobile devices, such as motorized mirrors. The current flow paths are typically paired to provide current flow control to opposite sides of each motor and therefore control the action of these motors. The motors in these motorized mirror applications are some times additionally equipped with a second control device such as a manual override controller connected in parallel with the microprocessor controlled power delivery circuit. In these applications, the potential exists for the two controllers to compete with each other exposing the power delivery circuit to contention currents resulting from shorts to source power or ground through the second control device.

The ever increasing use of microprocessors to control the current flow in these power deliver circuits provides a ready source of intelligence for use in short circuit protection. The present invention provides short circuit protection in power delivery circuits using a simple passive component electric circuit and a microprocessor.

It is an object of this present invention to provide a power delivery circuit with short circuit protection using a simple passive electrical component circuit and a microprocessor.

It is another object of this present invention to provide a power delivery circuit having short circuit protection against both shorts to source power and to ground.

It is still another object of this present invention to provide a power delivery circuit with short circuit protection responsive to the voltage at the circuit's load connection terminal.

It is yet another object of this present invention to provide a power delivery circuit with short circuit monitoring and protection at each of the circuit's load connection terminals.

It is a further object of the present invention to provide a microprocessor controlled power delivery circuit having short circuit protection that uses simple passive electrical components and the microprocessor.

It is still a further object of the present invention to provide a power delivery circuit having intelligent short circuit protection.

It is yet a further object of the present invention to provide a power delivery circuit having fast-acting hardware short circuit protection coupled with intelligent software short circuit protection.

These and other objects of the present invention will become readily apparent after studying and understanding the present invention, as hereinafter described.

SUMMARY OF THE INVENTION

The present invention advantageously provides a microprocessor controlled power delivery circuit with short circuit protection. The microprocessor controls the load current flow at the circuit's load connection terminal by connecting this terminal to one potential or the other of a power supply or opening the circuit to prevent current flow. The short circuit protection uses a passive electrical component feedback circuit to communicate the voltage level at the circuit's load connection terminal back to the microprocessor. The microprocessor routinely monitors this voltage and compares this voltage against the expected voltage at this terminal. When the actual voltage does not match the expected voltage, the circuit will provide protection by interrupting current flow through the load connection terminal.

In another embodiment, the present invention provides a microprocessor controlled power delivery circuit having dual-action short circuit protection. The microprocessor controls the load current flow at the circuit's load connection terminal by connecting this terminal to one potential or the other of a power supply or opening the circuit to prevent current flow. The short circuit protection for the power delivery circuit is provided by a simple passive electrical component feedback circuit that electrically couples the circuit's load connection terminal to the microprocessor's multiplexed input/output control signal line.

After the microprocessor momentarily sends an output signal, via the control signal line, to initiate the connection of the load connection terminal to either source power or ground, the feedback circuit maintains this connection. When a short circuit occurs at the load connection terminal, the feedback circuit protects the circuitry by switching the terminal connection to the opposite potential of the power supply, for instance from source power to ground and vice versa. This will bring the load connection terminal to the same voltage potential as that presented by the short circuit which stops the potentially damaging current flow through the power delivery circuit.

The microprocessor routinely monitors and compares the actual voltage at the load connection terminal against the expected voltage. When there is a short circuit condition at the terminal, the actual voltage will not match the expected voltage. The microprocessor will send a momentary output signal re-connecting the load connection terminal back to the originally requested power supply potential. If the short circuit still exists, the feedback circuit will not maintain this connection but rather it will switch the output terminal to the opposite power supply potential. If these conditions persist for a pre-determined number of cycles, the microprocessor will determine that a valid short circuit is present at the load connection terminal. The microprocessor will proceed to protect the circuitry by switching the load connection terminal connection to an open circuit or a high impedance state, a substantially open circuit, essentially limiting all current flow through the load connection terminal.

DETAILED DESCRIPTION OF THE INVENTION

Figure 1:
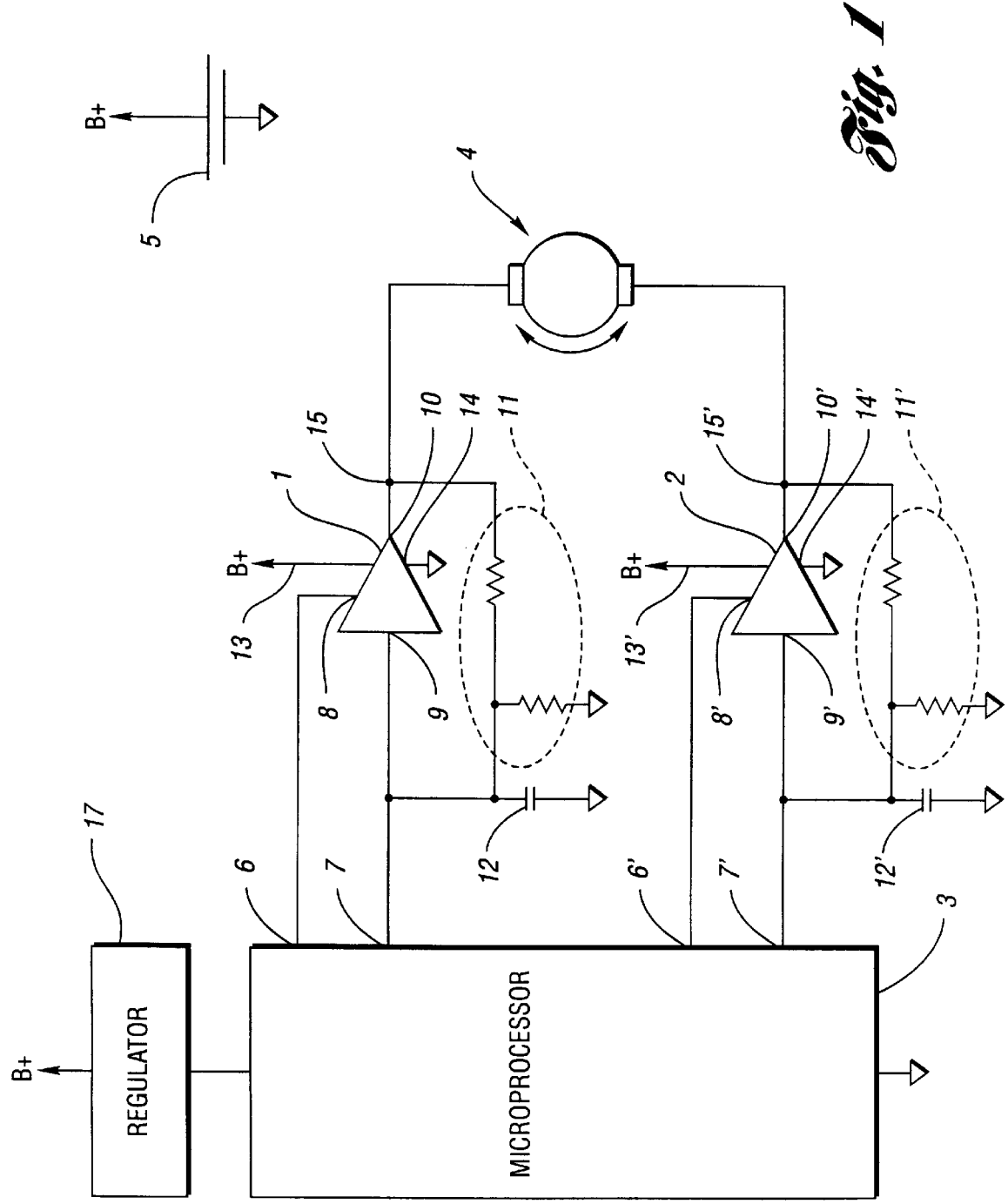
FIG. 1 is a schematic circuit diagram depicting one embodiment of the power delivery circuit with short circuit protection of the invention.

Before the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

In FIG. 1, the circuit shows a general overview of, an exemplary, dual half-bridge driver power delivery circuit with short circuit protection. The power delivery circuit of FIG. 1 depicts the control circuitry associated with half-bridge drivers 1 and 2. These half-bridge drivers in this example are identical and are connected in an identical fashion. For ease of understanding, the related elements in each circuit have been assigned the same numeric designation and differentiated by the addition of a superscripted prime for those elements relating to half-bridge driver 2.

Considering first the half-bridge drivers 1 and 2, the load, or output, node 10 and 10' of the drivers are connected to a load connection terminal 15 and 15'. These load connection terminals can be connected to opposite sides of a load 4, in this instance a bi-directional electric motor. The power, or "high" side, node 13 and 13' of the half-bridge drivers are connected to the relatively positive side of a power supply, in this instance a battery 5 which may correspond with a storage battery in a vehicle. The common, or "low" side, node 14 and 14' of the drivers are connected to the opposite polarity of the power supply, which in this instance is connected to ground potential. Ground potential serves as the reference potential for the circuit. The enable node 8 and 8' is connected to a switching or controlling device, in this instance to an output 6 and 6' on a microprocessor 3. Similarly, the input, or control, node 9 and 9' may be connected to either a different switching or controlling device or, as in this instance, to the same microprocessor 3 but at a different point, a multiplexed input/output 7 and 7'.

The switching circuits depicted in this embodiment of the invention are of the half-bridge type although any suitable current path switching circuit may be used including circuits comprising multiple transistors. The half-bridge drivers of this invention may be of any type suitable for this purpose including: half-bridge driver circuits composed of discrete components and those having one or more drivers on an integrated circuit, for example one of the L293 integrated circuits supplied by SGS-Thomson Microelectronics.

Half-bridge drivers are characteristically circuits that when enabled, via the enable node, have an output level that will take on the logical state of the input. When the driver is not enabled (disabled), the output state shall become high impedance, regardless of the input state. In the high impedance state, the output is essentially an open circuit as virtually all current flow is stopped. The half-bridge driver may be enabled either by setting the enable high or low depending on the particular design characteristics of the driver. The high output state means the output is connected, either directly or indirectly, to the power node of the circuit and the low output state means the output is connected, either directly or indirectly, to the common node of the circuit.

Returning to FIG. 1, the microprocessor 3 may be any microprocessor suitable for this purpose. This may include any of those in the Motorola 68HC05, 68HC08 and 68HC11, SGS-Thomson Microelectronics ST7 and ST9, National Semiconductor COP-8 families or the like. The microprocessor may utilize digital, analog and/or multiplexed inputs/outputs or combinations of these for communicating with the circuitry. The microprocessor is typically supplied, as in this instance, from the same power supply 5 as used in the power delivery portion of the circuit. It may be necessary to condition the power for use by the microprocessor by employing a known power conditioning device 17, such as a regulator.

Continuing with FIG. 1, the output node 10 and 10' of the drivers is connected to the input node 9 and 9' via a resistive feedback circuit which comprises a resistor divider circuit 11 and 11' and a filter capacitor branch circuit 12 and 12' which connects to the ground source. This feedback circuit advantageously enables the circuit to latch the driver in a particular state while at the same time providing a means to electrically communicate the voltage at the load connection terminal 15 and 15' to the microprocessor input/output 7 and 7'.

The components of this feedback loop are selected based on the overall characteristics of the circuit. The resistors in the divider circuit 11 and 11' should be selected to provide a voltage corresponding to the voltage at the output that is compatible with the ranges specified for the microprocessor inputs and power delivery circuit inputs. For example, if the power source is an automobile battery having a nominal voltage in the range of 9 to 16 volts, as in this instance, the pulldown resistor to ground may be about 15 K ohms and the in-line coupling resistor may be about 10 K ohms.

The capacitor in the filter capacitor branch circuit 12 and 12' should be suitably sized to filter out transient voltages while allowing the feedback circuit to adequately respond to short circuits at the load connection terminal 15 and 15'. A typical capacitor for a circuit of the present example will be about 4700 picofarads.

Figure 2A:
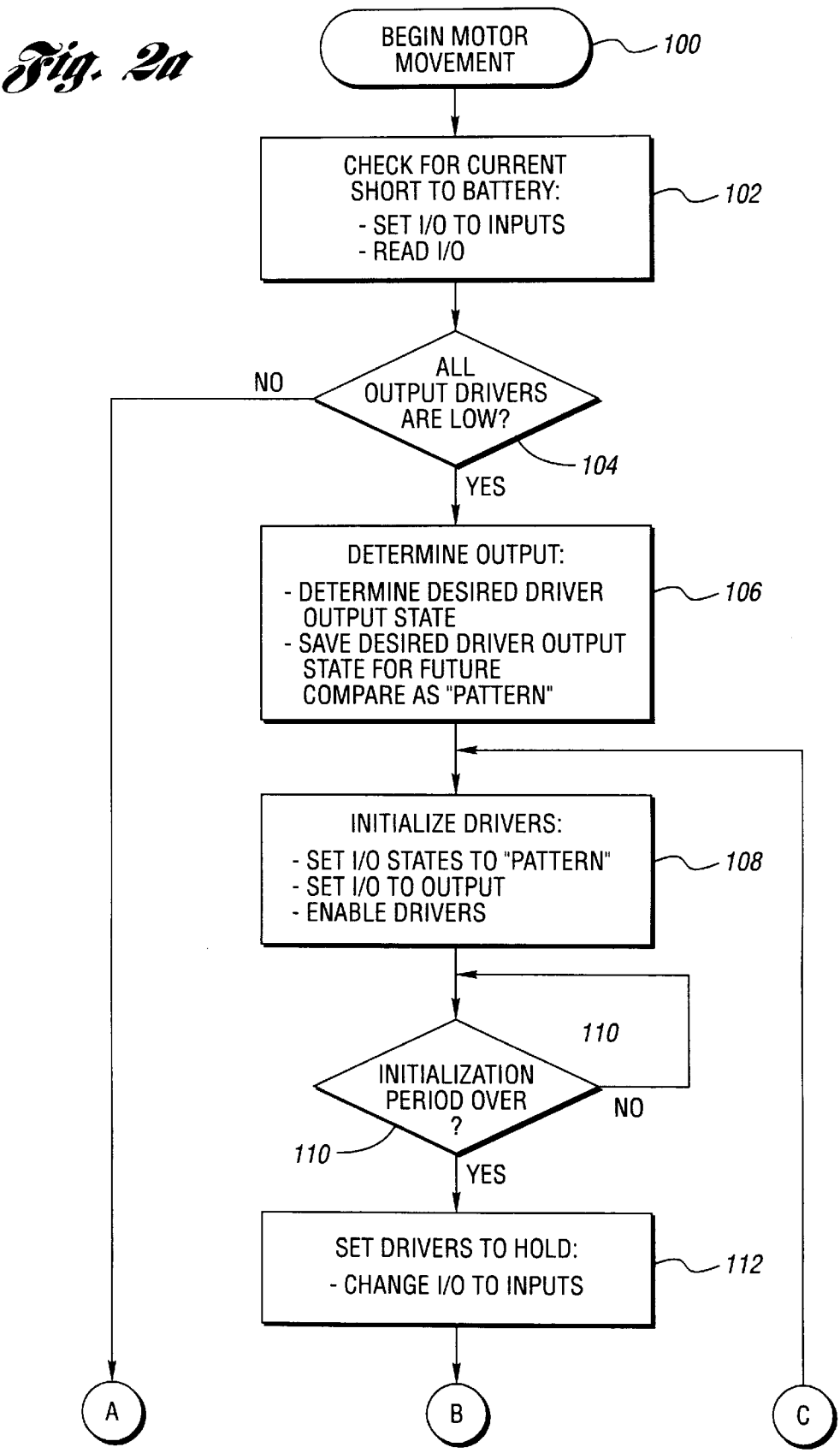
FIGS. 2A & 2B present a flow chart outlining the steps performed by the microprocessor depicted in FIG. 1.
Figure 2B:
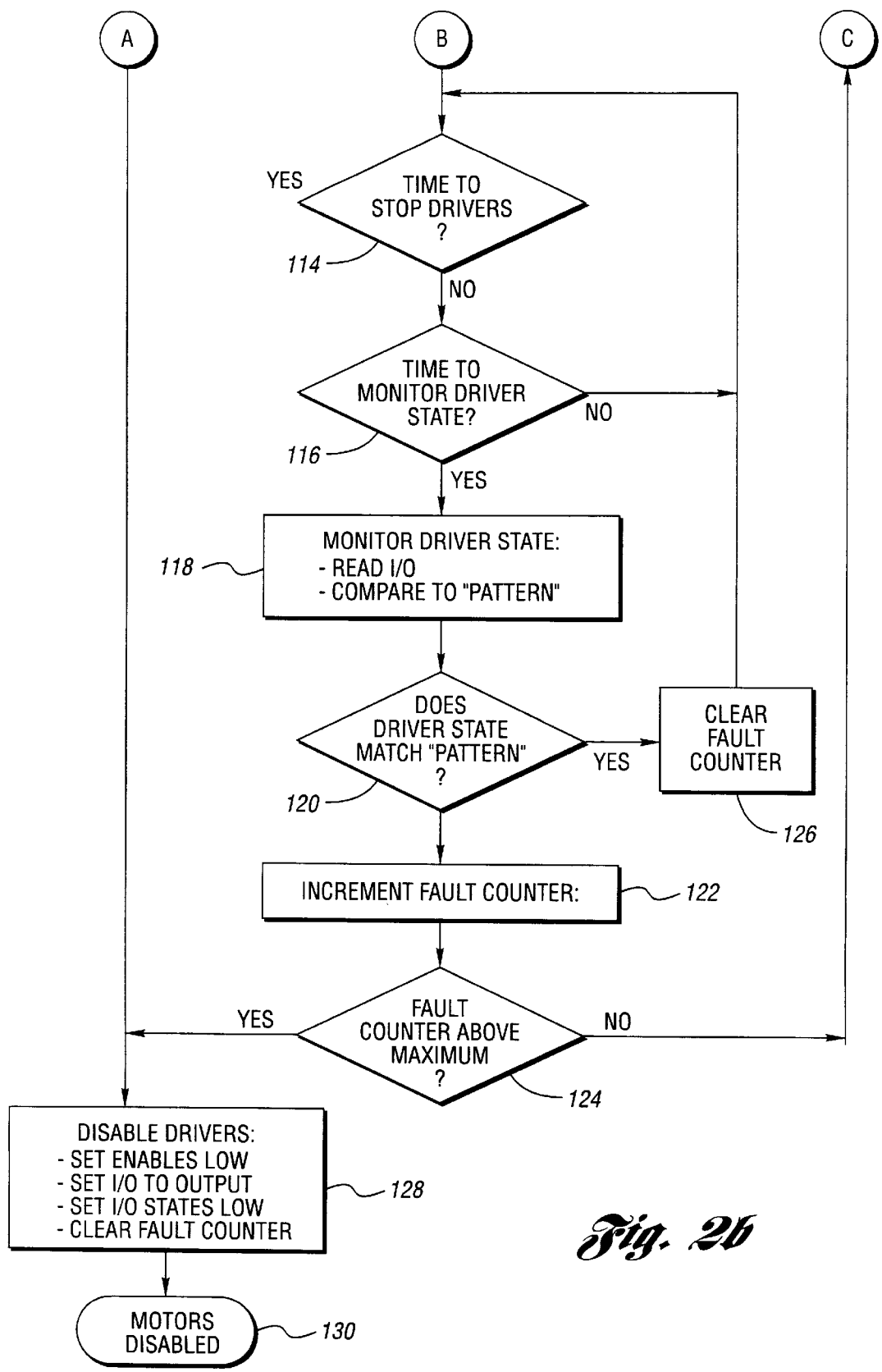

A flow chart of the steps to be implemented by the microprocessor of FIG. 1 is outlined in FIGS. 2A & 2B. The microprocessor 3 receives a request 100 to operate the motors from a switch or other communication device, not considered part of the present invention. Before proceeding with the request to move the motors, the processor checks 102 for any shorts to battery by setting all input/outputs 7 and 7' to input mode. When these input/outputs are set to the input mode the microprocessor is able to monitor the voltage at the load connection terminals 15 and 15', via the resistive feedback circuit.

If the voltage at the load connection terminals 15 and 15' is high 104, the microprocessor proceeds to step 128, in FIG. 2B, wherein the processor: i) sends a low output signal, via outputs 6 and 6', to the enable node of the drivers which disables the drivers, ii) switches the input/outputs 7 and 7' to output mode and transmits a low signal to the input node of the drivers, and iii) resets the microprocessor's fault counter.

If all the driver outputs are low 104, the processor proceeds to process the operate motor request to determine which output states are required to rotate the motor in the required direction. The rotation of the bi-directional motor 4 is controlled by causing current to flow therethrough in one direction or the other. Thus, for example, half-bridge driver 1 can be switched high, such that its power node 13 is connected to the output node 10, and the opposing half-bridge driver 2 can be set low, which connects its output node 10' to the common node 14', causing the motor to rotate in a direction relative to the current flow. Based on the desired rotation, the microprocessor determines 106 and stores the desired output state for each of the input/outputs 7 and 7', creating a pattern for the outputs (hereinafter "the Pattern").

The microprocessor then proceeds to initialize 108 the drivers by i) setting the output state of the input/outputs 7 and 7' in accordance with the Pattern, ii) sending the selected output state to the driver input nodes 9 and 9' by switching the input/outputs 7 and 7' to the output mode, and iii) setting the outputs 6 and 6' to the high state which enables the drivers. The drivers respond to the signals from the microprocessor by switching each drivers' output node 10 and 10' to the power node 13 and 13' or common node 14 and 14' accordingly.

The input/outputs 7 and 7' are maintained in this state until the initialization period is over 110. The microprocessor should maintain this initialization state for a period of time sufficiently long enough to allow the output to stabilize and to charge the filter capacitor 12 or 12', for example 40 microseconds.

After the initialization period, the microprocessor changes 112 the input/outputs 7 and 7' to input mode and allows the resistive feedback loop 11 and 11' to hold the drivers in their present state. The microprocessor routinely checks 114 for additional requests to change the state of the motor or stop the motor. Upon receipt of such a request, the microprocessor proceeds to disable the drivers at step 128. If no request to stop the motor is received, the microprocessor checks 116 to see if the monitor driver state timer has timed out.

If the timer has not timed out, the microprocessor loops back to step 114 as indicated by the arrows on the flowchart. The monitor driver state timer determines how often the microprocessor will monitor the outputs and the overall circuit's response to a short circuit condition. This time period is dependent on the particulars of the circuit and may be any suitable value, for example about 10 to 25 milliseconds.

If the time to monitor timer 116 has timed out, the microprocessor reads 118 the inputs of the input/outputs 7 and 7' and compares 120 these to the Pattern, the state last requested. If the input signals match the Pattern, the microprocessor proceeds to clear 126 the fault counter, then returns to step 114.

If a discrepancy exists between the inputs and the Pattern in step 120, the microprocessor increments 122 the fault counter. If the fault counter has not reached the pre-selected maximum value 124, the microprocessor returns to step 108. If the fault counter has reached the pre-selected maximum value, the microprocessor proceeds to disable drivers at step 128. The disabling of the drivers sets the output to high impedance and disables 130 the motors.

The pre-selected maximum value in the fault counter determines, in the event of a short circuit, the number of re-initialization cycles the circuit will perform before disabling the drivers. This value can be set at 0, a finite number, or infinity. When the value is zero, the microprocessor will disable the drivers without performing a re-initialization. When the value is infinity, the fault counter will never disable the drivers. When the value is a finite number, the circuit will attempt to re-initialize the drivers for the selected number of cycles and then disable the drivers.

For a better understanding of how the power delivery circuit with short circuit protection depicted generally in FIGS. 1 & 2 operates, the following non-limiting example provides a description of operation. Both drivers 1 and 2 follow the same procedure, so the description for only one driver 1 is given.

Disabled State

Initially, the microprocessor 3 holds the enable line 6,8 in the disabled state. This causes the driver output 10 to go to high impedance. The high impedance stops virtually all current flow through the load connection terminal 15 essentially creating an open circuit. The multiplexed input/output 7 is set to output mode with the output signal set to low.

Initial Check for Current Short to Battery

When the microprocessor receives 100 a request to activate/move the driver/motor, the microprocessor switches the input/output 7 to input mode and then executes a read 102 of the input/output. If the read confirms 104 that the output 10 of the driver is low 104, the microprocessor advances to determine 106 what signal to send to the driver. If however the output of the driver reports 104 a high signal, it is assumed that a short circuit to battery exists on that output 10 and the driver is returned to the disabled state 128.

Initialize Drivers

The microprocessor input/output 7 is switched to output mode and an output signal responsive to the move motor request is stored 106 in a data register and sent 108 to the output. Simultaneously, or shortly thereafter, the microcomputer 3 enables the driver by driving 108 the enable node 8 high with a signal from the microprocessor output 6. The microcomputer maintains these settings for a time, $t_{init}$, which provides adequate time for the filter capacitor 12 to charge and the driver output 10 to stabilize under normal loads. Once $t_{init}$ expires 110, the microcomputer 3 configures the input/output 7 to input mode and the output level of the driver, via the resitive feedback circuit 11, holds the driver input in the proper state.

Hold Drivers

Once the driver has been initialized with a normal load attached, the voltage at the load connection terminal 15 of the driver, through the resistive feedback circuit 11, will hold 112 the input 9 of the driver in the initialized state. The filter capacitor 12 will assist in providing resistance to noise, static, surges, etc. from toggling the state of the driver. The microprocessor maintains the output 6 to the enable node 8. The microprocessor periodically polls 118 the input/output, which is in input mode, and compares 120 the reported state with the requested state, the Pattern. If the two states match 120, the microprocessor clears 126 the fault counter and proceeds with its other tasks. The circuit will continue in this mode until a short circuit occurs or the microcomputer requests the drivers to stop.

Ground Short Circuit Protection

A driver that is in the high state and has its output short circuited to ground may experience a potentially damaging high current flow. This high current does not continue for long because the grounded output discharges the filter capacitor 12 through the resistor divider network 11 resulting in the driver input 9 level changing from a logical high to a logical low. Once this reversal occurs, the driver output 10 is switched to the low side of the power supply (i.e. common) and the high contention current is stopped. The delay time between the initiation of the short circuit and the driver state toggling from high to low is adjusted by selecting different feedback resistors 11 and capacitors 12 in the feedback circuit.

After a pre-selected time 116, the microcomputer will poll 118 the input/output 7 and determine that the voltage at the load connection terminal 15 does not compare 120 with the intended voltage output state of the driver. The microcomputer will increment 122 a fault counter and, if not equal to or greater than the pre-selected maximum value, attempt to re-initialize 108 the driver to the original state. During the re-initialization period 110, the driver responds to the signal from the microprocessor, over the signal produced by the feedback circuit, causing the driver to return to the high state. If the short circuit still exists, the potentially damaging current will again flow through the driver during the re-initialization period 110.

Once the re-initialization period has expired, the high output signal from the input/output 7 will terminate and the input/output 7 will be switched to input mode. The signal provided through the feedback loop will cause the driver output 8 to revert from high to low. This will stop the potentially damaging current since the driver output voltage is now set to the same voltage level as that presented by the short circuit condition. At the next polling interval 116, the microprocessor will again read 118 the voltage at the load connection terminal 15 and again detect 120 it not equivalent to the intended voltage output state of the driver. Again, it will increment 122 the fault counter. This sequence of software re-initialization, hardware reversal, will persist until the fault counter reaches 124 the pre-selected maximum value. At that point, the short circuit is considered to be a valid, non-transient, short to ground and the microprocessor will place the driver in the disabled state 128.

Battery Fault Protection

If a short circuit to battery existed at the time the motor request was first received, the procedure would have detected 104 this condition and maintained 128 the drivers in their disabled state.

After the driver is initially set to a low state, the driver is held in the initialized low state by the resistive feedback circuit 11 from the driver output 112. When a short circuit to battery occurs at the load connection terminal 15, a potentially damaging high sink current flows through the driver circuitry. The voltage on the filter capacitor 12 rises above the driver input threshold causing the driver state to reverse from low to high. This sets the driver output voltage potential to the same voltage potential presented by the short circuit condition and stops the potentially damaging current flow.

At a pre-selected time 116, the microcomputer will monitor 118 the voltage level at the load connection terminal 15 and compare 120 it to the expected voltage level. Since a short to battery condition exists at the load connection terminal 15, the microprocessor will detect 120 a fault. The microcomputer will increment 122 the fault counter and, providing it does not equal or exceed the pre-selected maximum value, will attempt to re-initialize 108 the driver output to the original state. If the short circuit still exists, the current will be high during the re-initialization period 110.

Once the re-initialization period expires 110, the low output signal from the input/output 7 will stop and the driver controlled by the feedback circuit will revert from low to high. Again, the microcomputer will monitor 118 the voltage at the load connection terminal 15 and determine 120 that it does not match the intended state. Again, it will increment 122 the fault counter and, providing the fault counter has not reached the pre-selected maximum value, proceed to re-initialize 108 the driver. This sequence of software re-initialization followed by the hardware reversing the state will continue until the fault counter reaches 124 the pre-selected maximum value. At that point, the short circuit is considered to be a valid, non-transient, short to battery and the microprocessor will proceed to place the driver in the disabled state 128.

Figure 3:
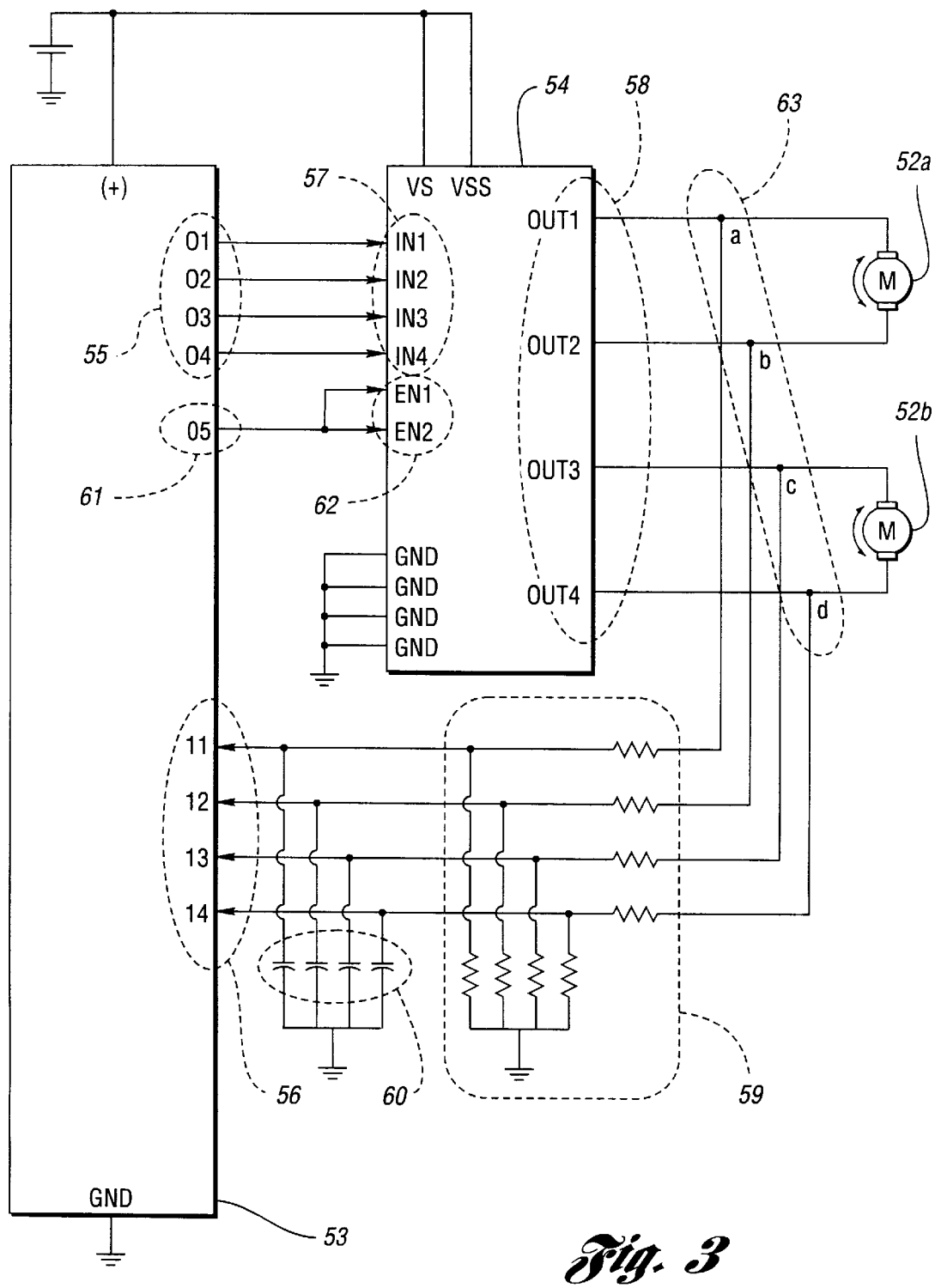
FIG. 3 is a schematic circuit diagram depicting another embodiment of the power delivery circuit with short circuit protection of the invention.

FIG. 3 depicts another embodiment of the present invention. This embodiment employs an integrated circuit for controlling power delivery to two bi-directional electric motors. Any suitable load current switching integrated circuit may be used in the present invention including an L293E, L293D or the like, supplied by SGS-Thomson Microelectronics, or any other suitable half-bridge drivers conventionally used in power delivery circuits.

The L293 is a standard integrated circuit commonly employed in power delivery circuits. The integrated circuit provides four output terminals OUT1-4 which are controlled by four corresponding input terminals IN1-4. Additional control is provided by the enable terminals EN1-2 which each control a pair of output terminals, specifically, EN1 enables OUT1 and OUT2 and EN2 enables OUT3 and OUT4. The output terminals go to high impedance when the respective enable terminal is set low, disabled. When the respective enable terminal is set high the output terminal will be either source power, if the respective input terminal is high, or common, if the respective input is set low.

Continuing with FIG. 3, the circuit is powered by a power supply 51, which can be any suitable source of power, for example a battery. The relatively high side, or plus side, of the power source is connected to the supply voltage terminal (+) of a microprocessor 53, and a supply voltage VS and logic supply voltage VSS terminals on a L293 integrated circuit 54. The relatively low side, or negative side, of the power supply is connected to a common ground for the circuit, along with the ground GND terminals of the L293 integrated circuit 54 and the microprocessor 53.

The L293 integrated circuit 54 is controlled by a microprocessor 53. The four outputs 55(01-4) on the microprocessor 53 are connected directly to the four inputs 57(IN1-4) of the L293 integrated circuit 54. The fifth output terminal 61(05) on the microprocessor 53 is connected to both enable terminals 62(EN1-2) on the L293 integrated circuit 54.

The four outputs 58(OUT1-4) on the L293 integrated circuit are connected to the four load connection terminals 63 (*a–d*). Each of these terminals are connected to the loads as follows: 63*a* and 63*b* are connected to opposite sides of the first load 52*a* and terminals 63*c* and 63*d* are connected to opposite sides of the second load 52*b*. The load may be any low current load typically controlled by these circuits for instance a solenoid, relay, power transistor, stepper motor, dc motor or the like. The exemplary loads depicted in FIG. 3 are bi-directional electric motors 52(*a–b*). A dual load power delivery circuit such as this may be used in a wide variety of dual motor applications, for instance an electrically powered automobile mirror. Where one motor drives the vertical movements of the mirror and the other drives the horizontal movements.

Each of the four load connection terminals 63 are individually connected back to an input 56(I1-4) on the microprocessor 53 through four individual feedback circuits. Each of these feedback circuits includes a resistive divider network 59 designed to condition the voltage to an acceptable range for the microprocessor input 56. The resistive divider network will comprise of at least two resistors: i) one coupling the load connection terminal 63 to the microprocessor input 56, and ii) one branching from the microprocessor input side of the coupling resistor to ground. Each feedback circuit also includes a filter capacitor 60 connected between the microprocessor side of the coupling resistor and ground.

In a typical automobile circuit where the power source is a 12 volt storage battery, the typical maximum voltage is between about 9 and 16 volts. In this instance, the feedback circuit to a digital input 6 on the microprocessor may consist of about a 56 K ohm coupling resistor, a 43 K ohm branching resistor, and a 1 nanofarad filter capacitor. If the feedback circuit is directed to an analog input 6 on the microprocessor, the coupling resistor may be about a 5.6 K ohm resistor, the resistor in the branched circuit to ground may be about a 4.3 K ohm resistor, and the filter capacitor in the parallel branch circuit to ground will be about 10 nanofarads. It should be appreciated that the components employed in the feedback circuit will be dependent on the particulars of the given circuit and may employ different sizes, types, arrangements and quantities of components.

Figure 4A:
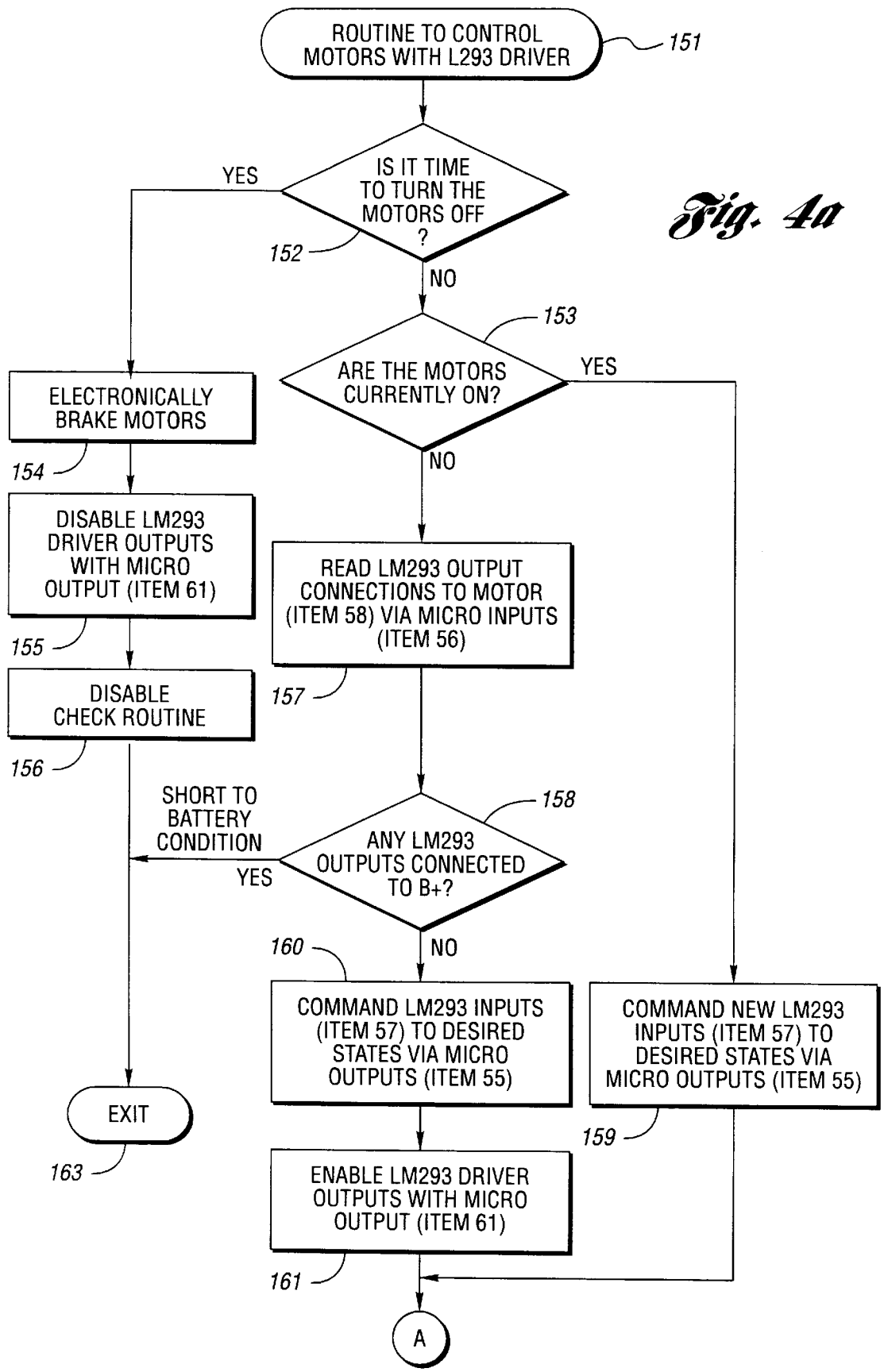
FIGS. 4A–4C present a flow chart outlining the steps performed by the microprocessor depicted in FIG. 3.
Figure 4B:
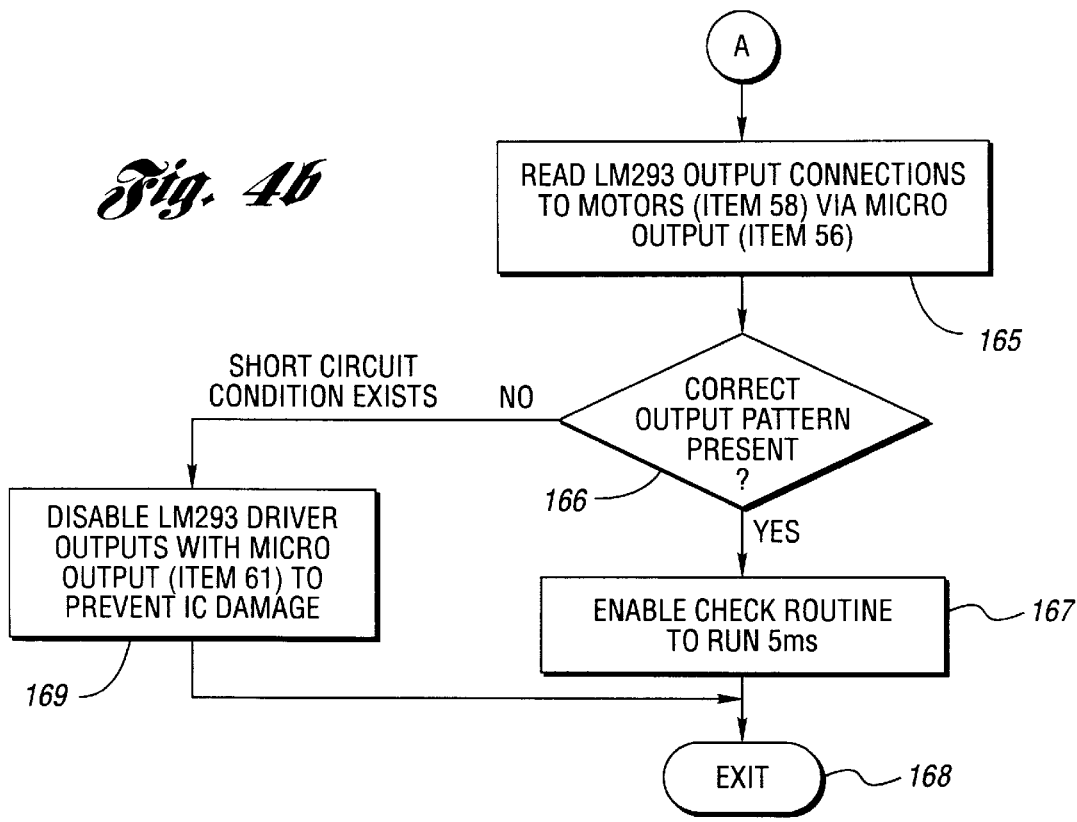
Figure 4C:
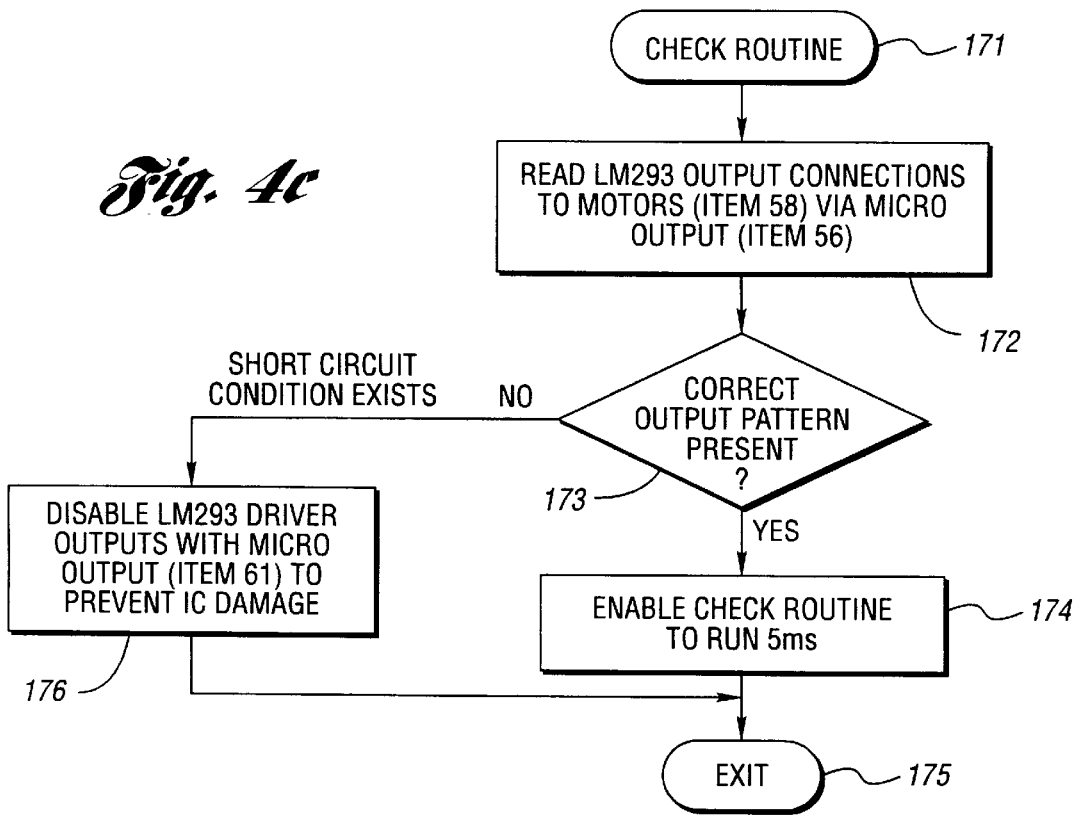

FIG. 4 depicts a flowchart of an exemplary procedure employed by the microprocessor 53 depicted in FIG. 3. The microprocessor upon receipt of a request 151 to control the motors will proceed to execute the process steps of this routine. If the request is to stop 152 the motors, the processor will proceed to step 154. If the request is for anything other than to turn-off the motors, the microprocessor proceeds to step 153.

If the motors are currently running 153, the microprocessor proceeds to command 159 the L293 inputs 57 by setting the microprocessor outputs 55 in accordance with the new request to control the motor. If the motors are not currently running 153, meaning the drivers are disabled, the microprocessor proceeds to poll 157 the inputs 56 to read the voltage level at the load connection terminals 63. If any of the inputs 56 read high, it is determined 158 that a short circuit to battery condition exists and that the drivers should remain disabled and the routine exited 163.

If all voltage levels at the load connection terminal are low, the process proceeds to set 160 the inputs to the desired state as determined from the control motor request 151. If the motor control request requested the first motor 52a to rotate, in a particular direction, this will determine which output 58(OUT1 & 2) should be set high and which output 58(OUT1 & 2) should be set low. After setting the driver inputs 57, the microprocessor proceeds to enable the drivers by setting 161 the enable output 61 high.

The drivers are now enabled and allowing load current to flow to the motors as directed by the original or new inputs set in steps 160 or 159, respectively. The microprocessor monitors the voltage level at the load connection terminals 63 by polling 165 the inputs 56 which are connected to the load connection terminals 63 through the feedback circuit. The microprocessor compares 166 the input values read to the expected values determined by the requested state of the drivers as indicated by the microprocessor outputs 55. If there is a mismatch 166 between the two states, it is determined that a short circuit exists.

The microprocessor can detect both shorts to grounds and shorts to battery by this method. For example, if the microprocessor sets a particular driver high and the corresponding monitored load connection terminal is reported as having a low voltage level, it will be concluded that a short circuit to ground exists at that load connection terminal. If the microprocessor sets a particular driver low and the corresponding load connection terminal is reported as having a high voltage level, it will be concluded that a short to battery exists at that load connection terminal. Once either type of short circuit is detected, the drivers are disabled 169 and the routine is exited 168.

Once the voltage levels at the load connection terminals 63 are satisfactorily confirmed with the corresponding microprocessor outputs 166, the microprocessor waits 167 a period of time, in this instance 5 milliseconds, before enabling 171 the check routine.

Once the check routine is invoked, the processor monitors 172 the voltage level at the load connection terminals 63 and compares 173 these to the intended state. If the microprocessor detects a mismatch, the drivers are disabled 176 and the routine is exited 175. If the values read at microprocessor inputs satisfactorily compare with the expected values relating to the microprocessor outputs, the microprocessor commands the check routine to run again after a pre-selected wait period 174, in this instance 5 milliseconds, and exits 175 the check routine. This delay period is set in the microprocessor and can be adjusted to a period that provides adequate protection for the circuitry based on the overall design of the circuit. This check routine continues to run periodically until it is disabled 156 or a short circuit is detected.

Returning to step 152, if the motors have been requested to be stopped, turned off, the microprocessor proceeds through a circuit shut-off routine. First, the motors are electronically braked by setting 154 all the driver inputs 57 low. The microprocessor then proceeds to disable the drivers by setting 155 the enable output 61 low. Finally, the microprocessor disables 156 the check routine and exits 163 this routine.

The circuits of this invention can be optionally equipped with a troubleshooting display or communication port. Since this circuit monitors each load connection point, it is possible to determine exactly which load connection point has a short circuit condition present. It is also possible to determine the type of short circuit condition that is present. This information can be registered by the microcomputer and/or reported to a troubleshooting device via a communications port and/or on a display.

The circuits of this invention can optionally be provided with a diagnostics feature. By connecting simulated loads and commanding a predetermined high and low signal pattern at the load connection points, the microprocessor can, via the inputs and outputs, be used to verify that the predetermined high and low signal pattern propagates through each component of the circuit. This will readily identify the location of any faults in the circuit. The microprocessor could record and/or report these faults via a display and/or a communication port.

What is claimed is:

1. A power delivery circuit for supplying load current to a load, comprising:

a load node for connection to a load said load node having a voltage;

a power node for connection to a source of an electric power supply;

a common node for connection to a common of said electric power supply;

a selector for controlling current through said load node; wherein said selector selects between three modes:
a first mode that enables current flow between said load node and said power node,
a second mode that enables current flow between said load node and said common node, and
a third mode that substantially limits any current flow through said load node; and an input for receiving at least one control signal directing said selector to select a particular mode; and a controller for generating at least one said control signal, wherein said controller compares the voltage at said load node with a value corresponding to said control signal and wherein said controller produces said control signal directing said selector to select said third mode when the voltage at said load node differs from said value.

2. The circuit of claim 1 wherein said selector input further receives a hold signal; and wherein said circuit further comprising:
   a feedback circuit for sending said hold signal corresponding to the voltage at said load node to said selector input.

3. The circuit of claim 2 wherein said hold signal directs said selector to select said first mode when said voltage at said load node is high and to select said second mode when said voltage at said load node is low.

4. The circuit of claim 3 wherein said controller measures said hold signal before enabling said selector to select one of said first and second modes.

5. The circuit of claim 1 wherein said controller is a microprocessor.

6. The circuit of claim 1 wherein said selector is a half-bridge circuit.

7. The circuit of claim 1 wherein said at least one signal comprises: a first signal directing said selector to said third circuit or to respond to a second signal; and said second signal directing said selector to said first circuit or said second circuit.

8. The circuit of claim 1 wherein said value is either a 0 or a 1.

9. The circuit of claim 1 wherein said voltage at said load node is communicated to said controller through an electrical circuit.

10. The circuit of claim 9 wherein said electrical circuit comprises at least one passive electrical component.

11. The circuit of claim 9 wherein said electrical circuit comprises at least one resistor and a capacitor.

12. The circuit of claim 9 wherein said electrical circuit comprises at least one voltage divider portion.

13. A power delivery circuit for supplying load current to a load, comprising:
   a load node for connection to a load, said lode node having a voltage;
   a power node for connection to a source of an electric power supply;
   a common node for connection to a common of said electric power supply;
   a selector for controlling current through said load node; wherein
   said selector selects between three modes:
      a first mode that enables current flow between said load node and said power node,
      a second mode that enables current flow between said load node and said common node, and
      a third mode that substantially limits any current flow through said load node; and an input for receiving:
      a hold signal, and
      at least one control signal directing said selector to select said first mode when said voltage at said load node is high and to select said second mode when said voltage at said load node is low;
   a controller for generating at least one said control signal for a period of time, wherein said controller compares the voltage at said load node with a value corresponding to said control signal, and, wherein said control signal overrides said hold signal when both said hold signal and said control signal are received at said selector input and,
   a feedback circuit for sending said hold signal corresponding to the voltage at said load node to said selector input.

14. The circuit of claim 13 wherein said controller periodically performs said comparison of the voltage at said load node to said value.

15. The circuit of claim 14 wherein said circuit further comprises a counter that increments to a new value each time said comparison results in a difference.

16. The circuit of claim 15 wherein said counter has a pre-selected maximum value.

17. The circuit of claim 16 wherein said controller generates said signal directing said selector to said third mode, when said new value equals or exceeds said maximum value.

18. The circuit of claim 17 wherein said selector does not respond to said hold signal when said selector is selected to said third mode.

19. A power delivery circuit for supplying load current to a load, comprising:
   a load node for connection to a load;
   a power node for connection to a source of an electric power supply;
   a common node for connection to a common of said electric power supply;
   a switching device for controlling current through said load node; wherein
   said switching device has three states:
      a first state that enables current flow between said load node and said power node;
      a second state that enables current flow between said load node and said common node; and
      a third state that substantially limits any current flow through said load node; and
   an input for receiving a control signal and a hold signal for directing said device into a particular state, wherein said device does not respond to said hold signal when in said third state;
   a controller comprising:
      a signal generator that periodically sends said control signal to said device input;
      a comparator that periodically compares the voltage at said load node to a value corresponding to said control signal;
      a counter having
         a pre-selected maximum value; and
         a count value that is incremented each time said comparator identifies a difference between said voltage and said value; and
      wherein said control signal sent by said signal generator directs said selector into said third state, when said count value equals or exceeds said maximum value;
   a feedback circuit for communicating said hold signal corresponding to the voltage at said load node to said selector input; and
   wherein said control signal overrides said hold signal.

20. The circuit of claim 19 wherein said circuit comprises semiconductor components.

21. The circuit of claim 19 wherein said switching device is an integrated circuit.

22. The circuit of claim 19 wherein said circuit further comprises diagnostics means for assisting in circuit diagnostics procedures.

23. The circuit of claim 19 wherein said circuit further comprises troubleshooting means for indicating trouble conditions identified in the circuit.

24. In a power delivery circuit comprising a power source, a load, and a driver having an output and at least one input for selectably connecting the load to either the power source or the ground, the improvement comprising: a protection circuit for introducing a high impedance into said power delivery circuit when said driver is short circuited to said source and when said driver is short circuited to the ground, said protection circuit including a first portion for introducing impedance into said power delivery circuit in response to a short circuit and a microprocessor for controlling said first portion and disabling said driver if the short circuit persists.

25. A power delivery circuit according to claim 24 wherein said first portion includes circuit means for sensing a voltage level at said driver output and interrupting said circuit in response to a change in said voltage level.

26. A power delivery circuit according to claim 25 including a filter for preventing transient fluctuations in said voltage level from affecting said circuit means.

27. A power delivery circuit according to claim 26 wherein said circuit means is responsive to voltage increases when said driver is connecting said load to ground and to voltage decrease when said driver is connecting said load to said power source.

28. A power delivery circuit according to claim 27 wherein said circuit means includes a connection between said driver output and at least one of said driver inputs.

29. A protection circuit for protecting a driver in a power delivery circuit from short circuits to a power source or to ground comprising:
    interrupter means for detecting a short circuit to ground and detecting a short circuit to the power source and interrupting current flow through the driver in response thereto;
    controller means for restarting the current flow after it has been interrupted; and,
    disabling means for disabling said driver after a given number of short circuits have been detected.

30. A protection circuit according to claim 29 wherein said driver includes an output and at least one input and wherein said interrupter means includes a circuit for sensing a voltage level at said driver output and interrupting said circuit in response to a change in said voltage level.

31. A power delivery circuit according to claim 30 wherein said circuit includes a connection between said driver output and at least one of said driver inputs.

32. A power delivery circuit according to claim 31 wherein said circuit is responsive to voltage increases when said driver is connecting said load to ground and to voltage decrease when said driver is connecting said load to said power source.

* * * * *